Feb. 6, 1962 H. R. DOAN ET AL 3,020,083
DOUBLE DECK TRAILER LOADING STRUCTURE
Filed Jan. 11, 1961 3 Sheets-Sheet 1
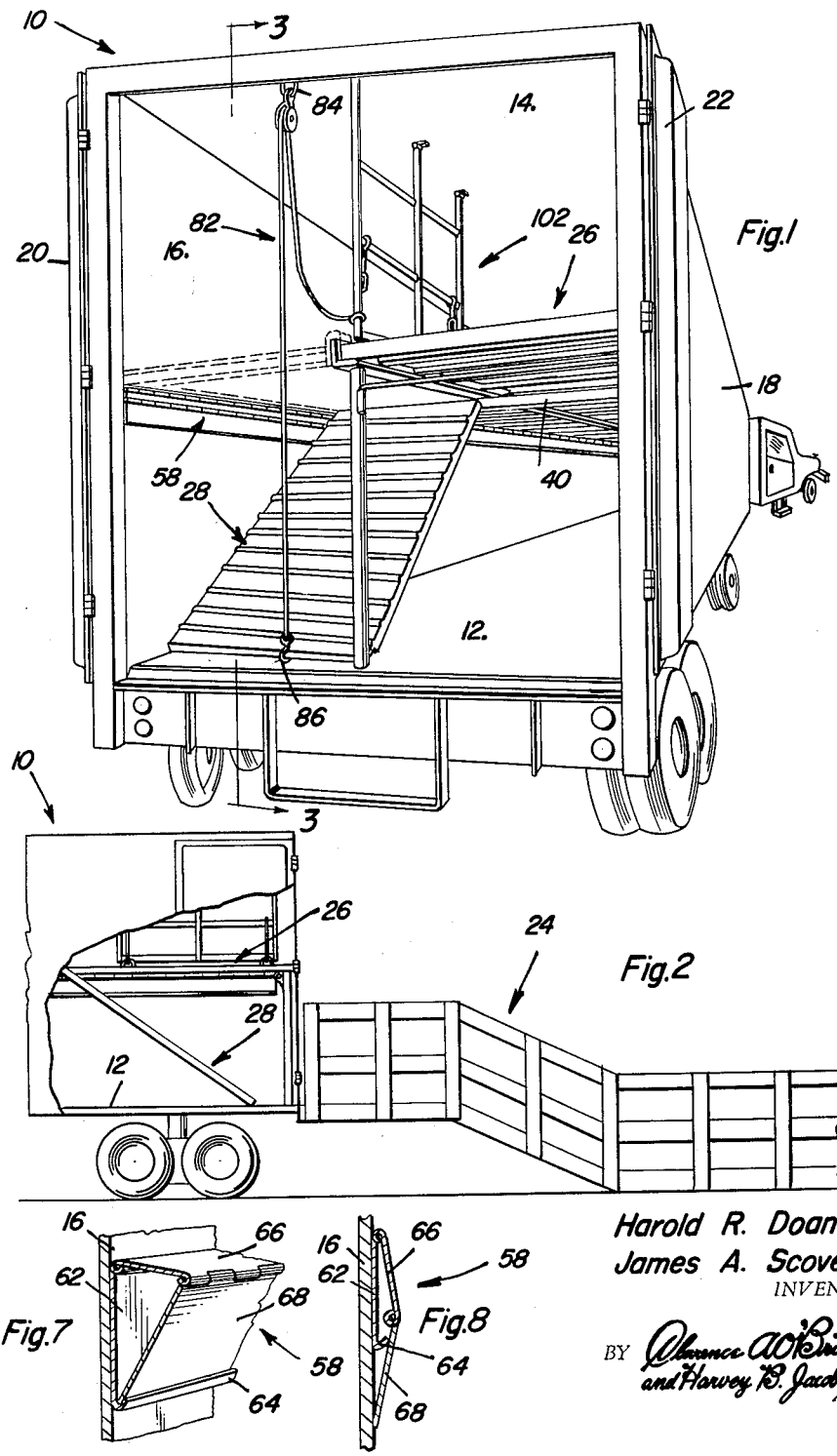
Harold R. Doan
James A. Scovel
INVENTORS

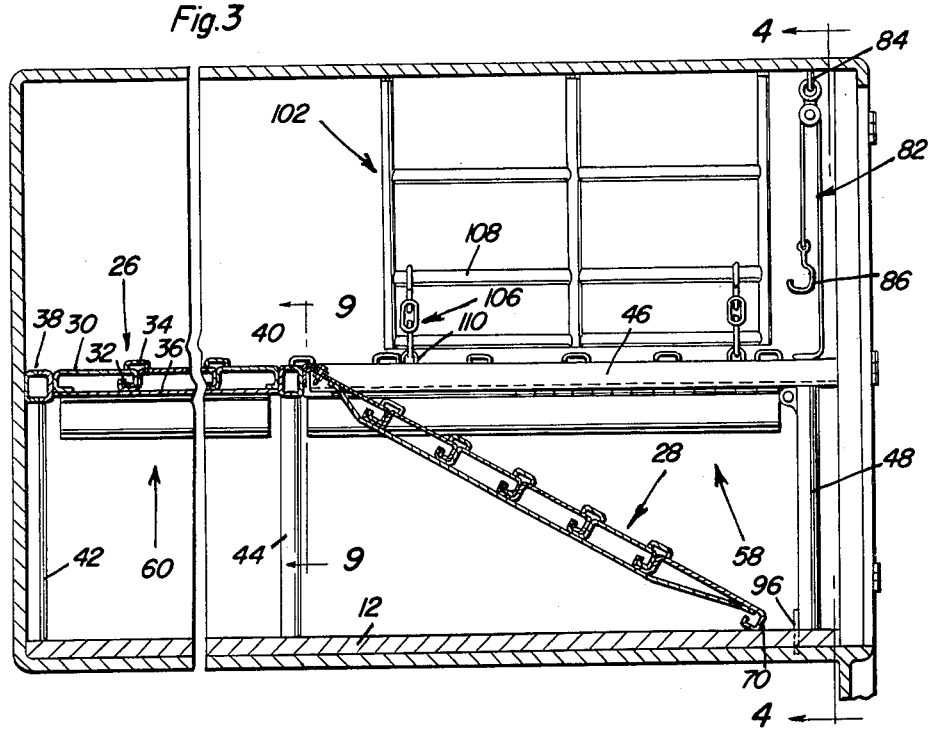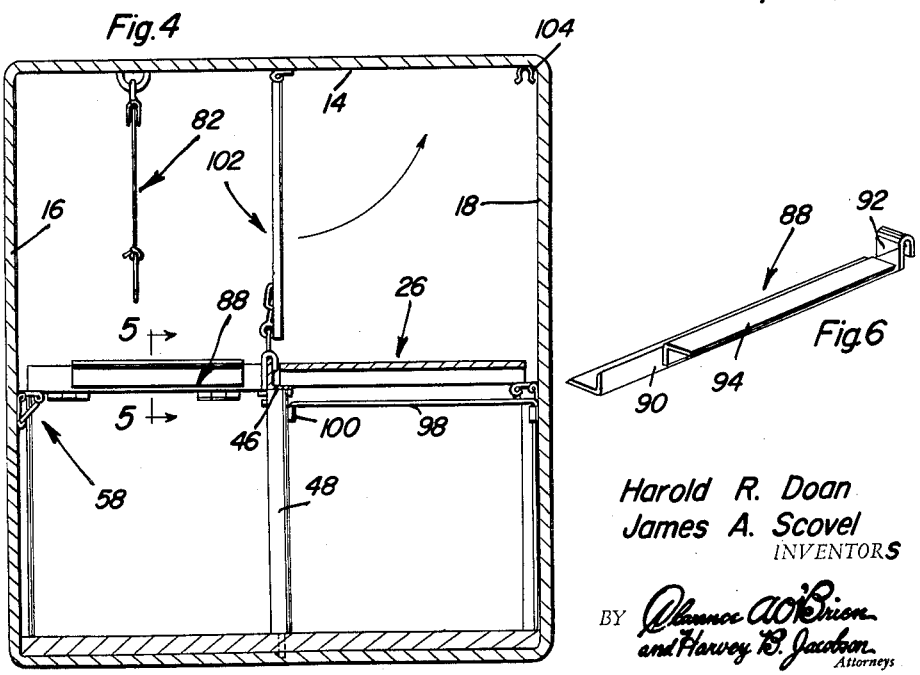
Harold R. Doan
James A. Scovel
INVENTORS

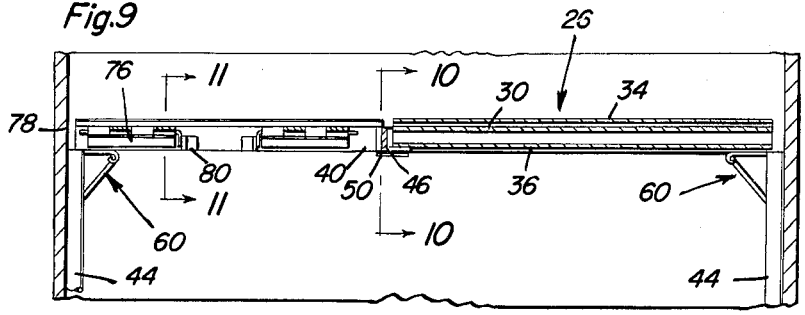
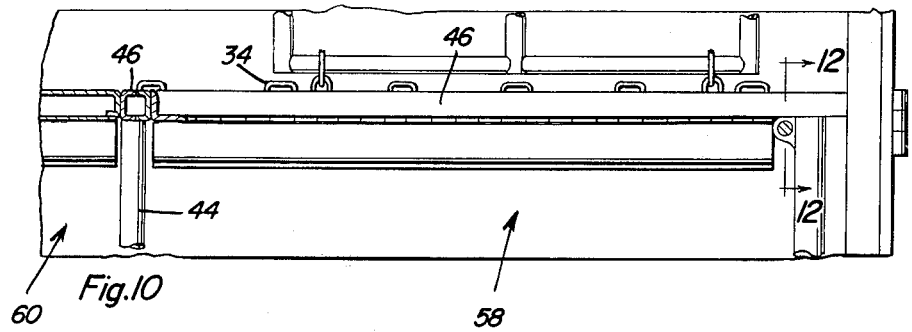
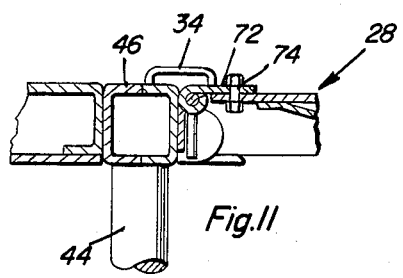
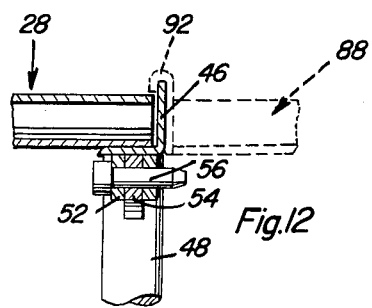
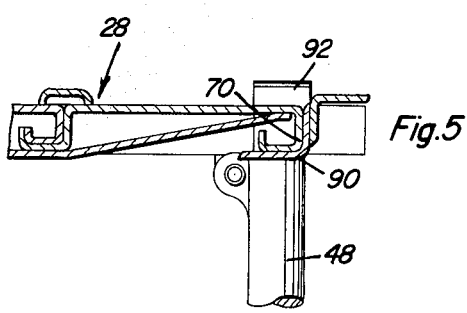
Harold R. Doan
James A. Scovel
INVENTORS

United States Patent Office 3,020,083
Patented Feb. 6, 1962

3,020,083
DOUBLE DECK TRAILER LOADING STRUCTURE
Harold R. Doan, 2103 Cleveland, and James A. Scovel, 220 S. 20th Ave., both of Caldwell, Idaho
Filed Jan. 11, 1961, Ser. No. 82,008
9 Claims. (Cl. 296—24)

This invention relates to a loading platform structure associated with trailer trucks of the type in which livestock are transported.

The present invention is particularly concerned with the loading and unloading of livestock to or from trailers which are provided with a partition vertically spaced above the trailer floor to form a second deck for support of livestock both on the trailer floor and at an upper level whereby a greater quantity of livestock may be carried by the trailer. Double deck livestock trailers of the latter type heretofore required special additional equipment for the purpose of loading both decks from the commercially available type of loading chute by means of which the livestock is loaded and unloaded into the trailer. The additional equipment in the form of double deck ramps necessary to enable loading of livestock from the loading chute onto the upper deck, had to be transported on the side of the truck or trailer and required at least two men to set it up in preparation for use. Both the ramp equipment and the time and men involved in installing it incurred considerable expense which is eliminated by the present invention.

It is therefore a primary object of this invention to provide a double deck platform structure for liestock trailers of a novel and useful construction whereby the upper platform forms its own ramp for the purpose of loading and unloading of livestock to and from the upper deck in association with the conventional livestock loading chute.

Another object of this invention is to provide a double deck platform for livestock trailers which features its own loading ramp for the upper deck, the loading ramp when elevated to an upper position forms a portion of the upper platform in order to relieve crowding of livestock at the upper level after loading thereof. The ramp section accordingly forms a portion of the platform when elevated and an upper deck ramp loading section when in a lowered position.

An additional object of this invention is to provide an upper deck platform structure for livestock trailers including a rear section which when lowered forms a loading ramp to the upper deck and featuring supporting structure for the ramp when in elevated position which supporting structure is of novel and useful construction arranged to avoid injury to the livestock when it is not supporting the ramp section.

The upper deck platform structure of the present invention therefore, has associated therewith a center support structure which forms the side of a ramp when a section of the upper platform is lowered into loading position. The ramp section of the platform is accordingly supported when in elevated position by a hinge-type bracket mounted on the side walls of the trailer which may be locked in an extended position for support of the ramp section. Also, the rear edge of the ramp section may be additionally supported by a removable support member resting between the extended bracket and center support structure. Also provided for safety precautionary purposes, is a gate rail disposed between the permanently elevated rear portion of the upper platform and the lowered ramp section which prevents livestock from falling onto the ramp. It will therefore be apparent that when the ramp section is lowered, livestock may be loaded or unloaded onto the upper deck by positioning the loading chute to one side of the rear of the open truck. After the livestock have been loaded onto the upper deck, the ramp may be elevated and supported in elevated position, with the livestock then being loaded onto the lower deck or floor of the trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing an open rear end view of a livestock truck trailer with the ramp section thereof shown in lowered position.

FIGURE 2 is a partial side elevational view with parts broken away showing the livestock trailer and loading chute arranged for loading of livestock onto the upper deck.

FIGURE 3 is a sectional view taken substantially through a plane indicated by section line 3—3 in FIGURE 1.

FIGURE 4 is a sectional view taken substantially along section line 4—4 of FIGURE 3 but illustrating the ramp section in elevated position.

FIGURE 5 is a partial sectional view taken through a plane indicated by section line 5—5 of FIGURE 4.

FIGURE 6 is a perspective view of the support member for the rear edge of the ramp section.

FIGURE 7 is a partial perspective view of the collapsible bracket shown in extended position.

FIGURE 8 is a partial sectional view of the collapsible bracket shown in a collapsed position.

FIGURE 9 is a sectional view taken substantially along section line 9—9 in FIGURE 3.

FIGURE 10 is a sectional view taken through a plane indicated by section line 10—10 in FIGURE 9.

FIGURE 11 is a sectional view taken through a plane indicated by section line 11—11 in FIGURE 9.

FIGURE 12 is a sectional view taken through a section indicated by section line 12—12 in FIGURE 10.

Referring now to the drawings in detail, FIGURE 1 illustrates most completely the novel structure of the present invention. It will therefore be noted in FIGURE 1, that the trailer truck generally referred to by reference numeral 10 is in itself of conventional design and includes a floor 12, a roof 14, and side walls 16 and 18 also of conventional construction. The rear portion of the trailer 10 through which the livestock is loaded accordingly includes the doors 20 and 22 which are open so that the livestock loading chute 24 as illustrated in FIGURE 2 may be positioned in alignment with one side of the rear opening of the trailer for the purpose of loading or unloading livestock. It will be observed, however, that the loading chute 24 which is of conventional design will only provide a passageway from the ground upwardly toward the floor 12 of the trailer. Accordingly, as will be more clearly seen from FIGURES 1 and 2, the upper deck of the trailer 10 which is formed by a platform generally referred to by reference numeral 26 includes a ramp section generally referred to by reference numeral 28 by means of which the livestock may be loaded or unloaded from the upper deck platform 26 to or from the loading chute 24. The ramp section 28 as shown by dotted line in FIGURE 1, when in elevated position will form part of the upper deck platform 26.

Referring now to FIGURE 3 in particular, it will be observed that the platform structure 26 is formed by a plurality of transversely extending deck members 30 which are interconnected with each other by interlocked portions 32 welded to each other. Transversely extending cleat members 34 are welded to the deck members 30 and straddle the interconnected portions thereof. A bottom plate member 36 is welded to the interlocked assembly. It will also be noted from FIGURE 3, that the rear portion of the platform assembly 26 is mounted between transversely extending members 38 and 40 formed from welded channel members. Vertical pipe post members 42 and 44 which are suitably anchored in the floor 12 of the trailer support the transverse members 38 and 40 and hence the rear portion of the platform 26 in vertically spaced relation above the floor 12. The members 38 and 40 are therefore welded to the top of the posts 42 and 44. The posts 42 are disposed at the forward corners of the trailer while the posts 44 will be disposed along the side walls 16 and 18 of the trailer intermediate the forward and rear ends thereof. Accordingly, the post supported member 40 to which the rear portion of the platform 26 is connected forms a support for the permanently elevated right rear portion of the platform 26 and the ramp section 28 as seen in FIGURE 1.

Referring now to FIGURES 3 and 9 in particular, it will be observed that the platform 26 is also provided with a center support member 46 which is an angle member supported at its rear end by a rear center post member 48 and at its forward end by an angle support member 50 which is welded to the rearward facing portion of the transverse member 40 intermediate the transverse ends thereof. The angle member 46 accordingly rests on the rearwardly projecting leg of the angle support member 50 at the forward end while the rear end of the member 46 as more clearly seen in FIGURE 12 has a pair of pivot ears 52 welded thereto which extends into a pivot projection 54 at the upper end of the post 48 for connection thereto by means of the pin member 56. Center support for the rear permanently elevated portion of the platform 26 is thereby provided for.

Additional support for the platform 26 is also provided by collapsible side brackets which extend longitudinally along the side walls 16 and 18 of the trailer suitably fastened thereto. It will therefore be observed from FIGURES 3, 9 and 10 that collapsible bracket assemblies 58 are provided on opposite walls 16 and 18 along the rear portions thereof while similar bracket assemblies 60 are provided along the side walls at the forward half thereof on the opposite side of the intermediate vertical support post 44 from the bracket assemblies 58. The rear bracket assemblies 58 are accordingly disposed between the intermediate vertical support post 44 and the rear center post 48. It will therefore be observed that when the bracket assemblies are in their illustrated extended positions they will support the longitudinal sides of the platform 26. It will also be apparent that the left bracket assembly 58 may support the ramp 28 in elevated position.

Referring now to FIGURES 7 and 8 in particular, it will be observed that the collapsible bracket assembly 58 includes a longitudinal hook member 62 suitably fastened to the side walls 16 of the trailer, the member 62 having a hook projection 64 along the bottom edge thereof. Hingedly connected to the top edge of the member 62 is a supporting surface member 66 which is hingedly connected to a longitudinally extending hinge lock member 68 whereby the lower edge thereof is engaged within the hook projection 64 as illustrated in FIGURE 7 for the purpose of providing rigid support for the supporting surface of the member 66. As seen in FIGURE 8, the bracket assembly 58 is in collapsed position in which case the hook projection 64 will be protectively disposed behind the member 68 which will form a smooth surface together with member 66 by virtue of the continuous hinge relationship between the members 66 and 68. Accordingly, the bracket assembly 58 when in collapsed position will prevent injury to livestock being loaded or unloaded through the ramp section 28 when in lowered position.

It will be noted that the structure of the ramp section 28 is similar to that of the permanently positioned portions of the platform 26 as hereinbefore described. The ramp section, however, includes a rear edge portion 70 as more clearly seen in FIGURE 3 and has a forward end to which a hinge member 72 is connected by means of bolt fastener 74 as more clearly seen in FIGURE 11. Referring therefore to FIGURES 9 and 10, it will be observed that the forward end of the ramp section 28 is provided with a pair of hinge members 72 which cooperate with a pair of hinge members 76 welded or suitably fastened to the rearwardly facing face of the transverse member 40. Hinge pins 78 extend through the hinge members 72 and 76 and are held in assembled position by a pair of keeper lug members 80. It will therefore be apparent that the ramp section 28 may be pivotally raised or lowered to either form a loading ramp or to form part of the platform 26. A block and tackle mechanism 82 is therefore provided including roof anchor 84 and a hook member 86 which is engageable with the rear edge 70 of the section 28.

In order to support the section 28 when in elevated position, a removable support assembly member 88 is provided for such purpose to support the rear edge portion of the ramp section 28 in addition to the support provided therefor by the extended hinge bracket assembly 58. Referring therefore to FIGURES 4, 5, 6 and 12 it will be observed that the removable support assembly member 88 includes a forward angle member 90 which has connected thereto at one end a hook support member 92 and along the rearwardly facing leg thereof the angle member 94. The member 88 is thereby supported on the support member 66 of the bracket assembly 58 at one end while the hook portion 92 of the member 88 rests over the upstanding leg of the center support angle member 46. The rear edge portion 70 of the ramp section 28 is thereby seated within the angle member 90 of the removable support assembly member 88 as more clearly seen in FIGURE 5. The ramp section 28 is thereby supported in elevated position by the collapsible hinge bracket assembly 58 and the center post 48. The center post 48 as seen in FIGURE 3 is accordingly suitably anchored in the floor 12 by means of an anchor member 96 inserted into the floor 12 and welded to the bottom of the post 48. It will also be observed from FIGURES 1 and 4, that additional bracing is provided by a brace rod 98 which is interconnected between the side wall 18 of the trailer and the post 48 by means of hook ends received within suitable brackets 100.

In order to confine the livestock to the permanently elevated portions of the platform 26 and prevent them from falling onto the ramp section 28 when in a lowered position, a gate assembly 102 made of pipe construction, is hingedly mounted on the roof 14 of the trailer. Referring therefore to FIGURES 3 and 4 in particular, it will be observed that the gate 102 may be swung up against the roof 14 when not in use and held thereto by suitable bracket clips 104 or any other equivalent holding mechanism. When the gate assembly 102 is in lowered position as illustrated, turnbuckle adjusted connectors 106 are provided and are pivotally connected to a bar 108 of the gate assembly and to anchor projections 110 that may be fastened to the center angle member 46 for projection thereabove. The gate assembly 102 is thereby securely held in place while the livestock is being loaded or unloaded.

From the foregoing description, operation and utility of the novel double deck loading structure of the present invention will be apparent. It will therefore be appreciated by those familiar with livestock trailer truck constructions, that by practice of the present invention, considerable expense is avoided by eliminating the need for additional ramp equipment and the expense and time involved installing and removing such equipment. It will also be appreciated, that the upper deck loading feature of the present construction is accomplished without any sacrifice of livestock transport space in the trailer.

The foregoing is considered as illustrative only of the principles of the invention. Further, since numerous modifications and changes will readily occur to those

What is claimed as new is as follows:

1. A double deck livestock loading structure for trailer trucks and the like comprising, upper platform means supported in spaced relation above a trailer floor, center support means mounted substantially along a longitudinal center line of said floor to support a rear portion of the platform means, ramp forming means hingedly connected to said platform means and forming a section of said rear portion of the platform means on one side of the support means when in elevated position and a ramp when in lowered position with a rear edge of the section resting on the floor, collapsible bracket means mounted on side walls of the trailer and operatively extended to support said ramp section when in elevated position and protectively collapsed when the section is in lowered position, gate means mounted on a roof of the trailer to form a protective rail for the rear portion of the platform means when the ramp section is in lowered position, and rear support means removably mounted on the center support means and the collapsible bracket means for supporting said rear edge of the ramp section in elevated position, said center support means comprising a rear supporting post mounted in the trailer floor and a longitudinal support member mounted at a rear end by the post in spaced relation above the floor to support the platform means thereon, and anchor means mounted on the support member for holding the gate means in operative position.

2. The combination of claim 1, wherein said collapsible bracket means includes a longitudinal hook member mounted on the side walls of the trailer and having an upward hook projection along a lower edge thereof, and a pair of hingedly interconnected sections, one of said hinge sections being hingedly connected to an upper edge of the hook member to form a supporting surface when the other section is engaged in the hook projection of the hook member.

3. A double deck livestock loading structure for trailer trucks or the like comprising, upper platform means supported in spaced relation above a trailer floor, center support means mounted substantially along a longitudinal center line of said floor to support a rear portion of the platform means, ramp forming means hingedly connected to said platform means and forming a section of said rear portion of the platform means on one side of the support means when in elevated position and a ramp when in lowered position with a rear edge of the section resting on the floor, collapsible bracket means mounted on side walls of the trailer and operatively extended to support said ramp section when in elevated position and protectively collapsed when the section is in lowered position, rear support means removably mounted on the center support means and the collapsible bracket means for supporting said rear edge of the ramp section in elevated position.

4. The combination of claim 3 wherein said collapsible bracket means includes a longitudinal hook member mounted on the side walls of the trailer and having an upward hook projection along a lower edge thereof, and a pair of hingedly interconnected sections, one of said hinge sections being hingedly connected to an upper edge of the hook member to form a supporting surface when the other section is engaged in the hook projection of the hook member.

5. The combination of claim 3, including gate means mounted on a roof of the trailer to form a protective rail for the rear portion of the platform means when the ramp section is in lowered position.

6. An elongated vehicle body having front and rear ends and including a floor, a pair of side walls, a deck mounted between said side walls in spaced relation from the floor, the rear end portion of said deck being provided with a recess extending from substantially the longitudinal center line of the deck to one of said side walls, a ramp having one edge thereof pivotally connected to said deck for raising and lowering movement between a lowered position wherein the ramp slants to said floor and a raised position wherein the ramp is coplanar with the deck and provides a closure for said recess, and collapsible bracket means provided on said one side wall and including a longitudinal hook member secured to said one side wall, said hook member having an upturned hook projection along its lower edge, and a pair of hingedly connected sections, one of said sections being hingedly connected to the upper edge of said hook member to provide support for said ramp when the latter is raised and the other of said sections is engaged with the hook projection of said hook member.

7. The device as defined in claim 6 wherein said vehicle body also includes a roof in spaced relation from said deck, together with a gate-like member disposed vertically between said deck and said roof at the side of said recess opposite from said one side wall of the body, and hinge means connecting said gate-like member to said roof whereby the gate-like member may be swung upwardly to an inoperative position underlying the roof.

8. The device as defined in claim 7 together with means for releasably anchoring said gate-like member to said deck to prevent swinging thereof.

9. The device as defined in claim 7 together with means for releasably retaining said gate-like member in its inoperative position under the roof.

References Cited in the file of this patent

UNITED STATES PATENTS

| 2,825,300 | Carlson | Mar. 4, 1958 |
| 2,970,861 | Short | Feb. 7, 1961 |

FOREIGN PATENTS

| 479,219 | Great Britain | Feb. 2, 1938 |